(12) United States Patent
Shinozuka et al.

(10) Patent No.: US 6,404,728 B1
(45) Date of Patent: *Jun. 11, 2002

(54) APPARATUS AND METHOD FOR DRIVING OBJECTIVE LENS

(75) Inventors: Hiroshi Shinozuka; Tomohiro Murayama; Tomomi Wakabayashi; Taizo Tateishi, all of Yokohama; Hiroshi Kawakami, Chigasaki, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,199

(22) Filed: Aug. 2, 1999

(30) Foreign Application Priority Data

Aug. 5, 1998 (JP) ............................................ 10-221801

(51) Int. Cl.[7] ...................... G11B 21/16; B23P 21/00; B23P 13/00; B28B 5/00
(52) U.S. Cl. ...................... 369/244; 29/469; 29/896.93; 29/527.1; 264/251
(58) Field of Search ............................. 369/244, 247, 369/44.14, 44.15; 359/813, 814, 823, 824; 29/469, 527.1, 896.9, 896.93; 264/250, 251

(56) References Cited

U.S. PATENT DOCUMENTS

| | | | | |
|---|---|---|---|---|
| 5,046,820 A | * | 9/1991 | Saekusa et al. | 359/814 |
| 5,206,762 A | * | 4/1993 | Kasahara et al. | 359/814 |
| 5,374,638 A | * | 12/1994 | Matsui | 369/244 |
| 5,381,273 A | * | 1/1995 | Goda | 359/811 |
| 5,414,563 A | * | 5/1995 | Tanaka | 359/814 |
| 5,455,811 A | * | 10/1995 | Tanaka | 369/44.14 |
| 5,566,149 A | * | 10/1996 | Song | 369/44.15 |
| 5,724,337 A | * | 3/1998 | Kawano et al. | 369/244 |
| 5,787,067 A | * | 7/1998 | Song | 369/247 |
| 5,841,593 A | * | 11/1998 | Ikegame et al. | 359/823 |
| 5,892,629 A | * | 4/1999 | Nishihara et al. | 359/814 |
| 6,163,416 A | * | 12/2000 | Uekusa et al. | 359/813 |

FOREIGN PATENT DOCUMENTS

| | | | | |
|---|---|---|---|---|
| JP | 60-197941 | * | 10/1985 | |
| JP | 63-032733 | * | 2/1988 | |
| JP | 5-266507 | * | 10/1993 | |
| JP | 8-321052 | * | 12/1996 | |
| JP | 8-321054 | * | 12/1996 | |
| JP | 8-321056 | * | 12/1996 | |
| JP | 8-321059 | * | 12/1996 | |
| JP | 9-016994 | * | 1/1997 | |
| JP | 09190644 A | * | 7/1997 | ........... G11B/07/22 |
| JP | 10-255292 | | 9/1998 | |

* cited by examiner

Primary Examiner—William Klimowicz
(74) Attorney, Agent, or Firm—Pillsbury Winthrop LLP (57) ABSTRACT

A method for manufacturing an objective lens driving apparatus comprising a lens holder which holds an objective lens and is driven in a focusing direction and a tracking direction with reference to the optical disk, at least two wires having first ends secured to the lens holder and controlling posture of the lens holder, and a wire holder to which second ends of the wires are fixed, the method comprising the steps of preparing a first integrally molded member including the lens holder and the wire holder which are connected together by a holder connecting frame to be removed after assembly, preparing a second integrally molded member including the wires which are suspended from a wire holding frame to be removed after assembly, positioning the second integrally molded member relative to the first integrally molded member such that the first ends of the wires are connected to the lens holder and the second ends of the wires are connected to the wire holder, and removing the wire holding frame and the holder connecting frame.

3 Claims, 8 Drawing Sheets

APPARATUS AND METHOD FOR DRIVING OBJECTIVE LENS

BACKGROUND OF THE INVENTION

The present invention relates to an apparatus and method for driving an objective lens used to record/reproduce information with reference to an optical disk, such as a CD (Compact Disk), a CD-RW (CD-ReWritable), a DVD-ROM (Digital Versatile Disk Read Only Memory) and a DVD-RAM (DVD-Random Access Memory).

In recent years, there is an increasing demand for flat-type optical disk recording/reproducing apparatuses (optical disk apparatuses). To provide such apparatuses, very strict requirements are imposed on the design of an objective lens driving apparatus which is used for recording/reproducing information with reference to an optical disk.

For example, in the case of an objective lens driving apparatus suitable for use in a ½-size optical disk having a height of 12.7 mm, the distance between the surface of the optical disk and the bottom surface of the objective lens driving apparatus must be shorter than 7.3 mm. Since the objective lens driving apparatus is installed in a restricted space, such as the space in a jacket-size apparatus or the space in a note book-included apparatus, the size of the objective lens driving apparatus is restricted in the horizontal direction as well.

In addition to the above, the objective lens driving apparatus is required to satisfy the requirements of a DVD disk, the integration density of which is seven times higher than that of an CD.

In the DVD optical system, the objective lens driving apparatus has to be very small in size and yet it must be provided with an acceleration generating function so as to ensure reliable data reproduction even when the disk is rotating fast. The objective lens driving apparatus must be also provided with such frequency characteristics as will satisfy wide-band servo specifications, because the waving and eccentricity of the disk occur at higher frequencies due to the fast rotation of the disk.

A CD system (CD×1) and a DVD system (DVD×1) will be compared with each other. (The "×1" is a standard transfer speed for audio CDs.)

(1) Number of Rotations
  CD×1: 3.3 to 8.3 Hz
  DVD×1: 9.6 to 23.1 Hz
(2) Allowable Limit Values in Focusing Direction
  ⑨ Waving Amount (Rotation Synchronization)
    CD×1: ±0.5 mm
    DVD×1: ±0.3 mm
  ② Waving Acceleration
    CD×1: 10 m/s²
    DVD×1: 8 m/s²
  ③ Allowable Residual Error
    CD×1: ±1 µm
    DVD×1: ±0.23 µm
(3) Allowable Limit Values in Tracking Direction
  ① Eccentricity (Rotation Synchronization)
    CD×1: ±70 µm
    DVD×1: ±35 µm
  ② Eccentricity Acceleration
    CD×1: 0.4 m/s²
    DVD×1: 1.1 m/s²
  ③ Allowable Residual Error
    CD×1: ±0.1 µm
    DVD×1: ±0.022 µm
  ④ Allowable Tilt of Objective Lens
    CD×1: ±5 mrad
    DVD×1: ±2 mrad As can be understood from the above comparison, the characteristics regarding the waving and eccentricity of the DVD system are improved; their figures are 0.5–0.6 of those of the CD system. In spite of this, however, the allowable residual error of the DVD system is less than ¼ of that of the CD system. This means that, due to the use of the servo system adopted, the accuracy required of the DVD system is twice as high as that of the CD system. Therefore, the high-frequency characteristic of the objective lens driving system must be expanded double, and the oscillation system including a secondary resonating unit and the electromagnetic driving system must be greatly improved, accordingly. When the rotating speed of a disk is increased, the electromagnetic driving system is required to use power with remarkably high efficiency, since the acceleration increases in proportion to the square of the number of rotations.

In the CD system, the allowable tilt of the objective lens can be realized without imposing severe restrictions on the manufacture of the CD system. In the DVD system, however, the allowable tilt of the objective lens cannot be easily realized and poses a lot of problems in the manufacture of the system, particularly when mass production of systems is considered. If the objective lens tilts, the parallelism of the objective lens to the surface of the optical disk is adversely affected. If this happens, an RF signal derived from a reflected beam from the disk decreases in level in accordance with an increase in the tilt angle, so that the reproduction or recording of data with reference to the optical disk may not be executed.

BRIEF SUMMARY OF THE INVENTION

As described above, the transition to the DVD system requires an objective lens driving apparatus which is highly sensitive, covers a wide frequency range and hardly tilts, and which can be provided in a very restricted space. However, such an objective lens driving apparatus cannot be easily designed by utilizing the structure of the conventional CD system or the conventional manufacturing system. In other words, the conventional technology regarding the CD system is not very useful in producing the required objective lens driving apparatus.

Accordingly, an object of the present invention is to provide an objective lens driving apparatus which is highly sensitive, covers a wide frequency range and hardly tilts, which can be provided in a very restricted space and which has such a structure as enables further enhancement in performance. Another object of the present invention is to provide a method for manufacturing the objective lens driving apparatus.

[I] According to the first aspect of the present invention, there is provided a method for manufacturing an objective lens driving apparatus comprising: a lens holder which holds an objective lens and is driven in a focusing direction and a tracking direction with reference to the optical disk; at least two wires having first ends secured to the lens holder and controlling posture of the lens holder; and a wire holder to which second ends of the wires are fixed, the method comprising the steps of: preparing a first integrally molded member including the lens holder and the wire holder which are connected together by a holder connecting frame to be removed after assembly; preparing second integrally molded member each including the wires which are suspended from a wire holding frame to be removed after assembly; positioning the second integrally molded members relative to the first integrally molded member such that the first ends of the wires are connected to the lens holder and the second ends of the wires are connected to the wire holder; and removing the wire holding frame and the holder connecting frame.

With this structure, since the lens holder and the wire holder are prepared as one integrally molded member, the wires can be attached to them in such a manner that the positional relationships which they have immediately after they are molded are maintained. Moreover, since the wires suspended by the wire holding frame are prepared as integrally molded members, the wires, even though they are thin, can be easily assembled without damage.

According to one embodiment, the wires, the lens holder and the wire holder are positioned relative to one another by bringing the holder connecting frame into contact with the wire holding frame.

[II] According to the second aspect of the present invention, there is provided an objective lens driving apparatus incorporated in an optical disk apparatus which is for recording or reproducing information from an optical disk, the objective lens driving apparatus comprising: a lens holder which holds an objective lens and is driven in a focusing direction and a tracking direction with reference to the optical disk; at least two wires having first ends secured to the lens holder and controlling posture of the lens holder; and a wire holder to which second ends of the wires are fixed, the wires being suspended by a wire holding frame which is to be removed after assembly, and the wires being first secured to the lens holder and the wire holder and then the wire holding frame being removed.

With this structure, since the wires suspended by the wire holding frame are prepared as integrally molded members, the wires, even though they are thin, can be easily assembled without damage.

According to one embodiment, the lens holder and the wire holder are held in such a manner that they are connected by the holder connecting frame which is to removed after assembly. After the wires are secured to the two holders, the wire holding frame is removed, thus allowing the two holders to move relative to each other. The wires are positioned with reference to the lens holder and the wire holder by positioning the wire holding frame with reference to the holder connecting frame.

With this structure, since the lens holder and the wire holder are prepared as one integrally molded member, the wires can be attached to them in such a manner that the positional relationships which they have immediately after they are molded are maintained.

According to one embodiment, the lens holder is provided with first bosses to which the first ends of the wires are to be fixed. The first ends of the wires have first insertion holes. After being loosely inserted into the first insertion holes, the first bosses are fixed therein by means of an adhesive. The wire holder is provided with second bosses to which the second ends of the wires are to be fixed. The second ends of the wires have second insertion holes. After being loosely inserted into the second insertion holes, the second bosses are fixed therein by means of an adhesive.

With this structure, the wires can be reliably bonded to the lens holder or the wire holder, with no need for direct adhesion between them.

According to one embodiment, the wire holder comprises a main body, and swinging sections integral with the main body. The second ends of the wires are secured to the swinging sections. One end of each swinging section is fixed to the main body by means of thin members, while the other end thereof extends to the region in the vicinity of the main body. It is preferable that a vibration suppressing member be interposed between the main body and the other end of each swinging section.

With this structure, since the swinging sections used for holding the second ends of the wires are integral with the wire holder, the wires can be assembled with high accuracy, which corresponds to the accuracy at which they are molded. Since this structure is effective in suppressing the resonance of the wires, excellent servo characteristics are ensured at high-frequency regions.

It is preferable that the above-mentioned swinging section be provided for each of the wires. However, if it is provided for one of the wires, resonance can be significantly suppressed.

According to one embodiment, the wire holder is provided with a gel reservoir located at a position corresponding to an intermediate portion of the wire. A gel member is sealed in the gel reservoir and serves to prevent the wire from vibrating.

The structure described above is effective in preventing the wires from buckling. In many cases, the vibration due to high-order resonant frequencies is transmitted in the direction in which the wires extend, and this vibration is likely to cause buckling of wires. According to the present invention, the gel described above serves to suppress the vibration at the middle point of each the wire, and the vibration can therefore be suppressed.

According to one embodiment, the lens holder is provided with a gel reservoir located at a position corresponding to an intermediate portion of the wire. A gel member for preventing vibration of the lens holder is sealed in the gel reservoir.

The structure described above is effective in preventing the lens holder from vibrating at high-order resonant frequencies.

According to one embodiment, the objective lens driving apparatus further comprises: a focusing coil, provided for the lens holder, for driving the lens holder in the focusing direction; a pair of tracking coils provided for those portions of the lens holder which are ends, as viewed in the tracking direction; and a pair of printed wiring boards, provided for those portions of the lens holder which are ends, as viewed in the tracking direction, and having wiring connected to the focusing coil and/or the tracking coils, the printed wiring boards being connected together by means of a board holding member which is to be removed after assembly, and the printed wiring boards being first secured to the lens holder and then the board holding frame being removed.

With this structure, since the printed wiring boards need not be positioned relative to each other, they can be easily assembled. In addition, since the board holding member is-removed after assembly of the printed wiring boards, movement of the lens driving apparatus need not be affected thereby.

According to one embodiment, the objective lens driving apparatus further comprises: a focusing coil, provided for the lens holder, for driving the lens holder in the focusing direction; a pair of tracking coils provided for those portions of the lens holder which are ends, as viewed in the tracking direction; and a flexible printed wiring board, provided for the wire holder and having external-connection wiring connected to the focusing coil and/or the tracking coils, the flexible printed wiring board having an intermediate portion which is intermediate as viewed in the tracking direction and which is reduced in width.

Since the intermediate portion of the flexible printed wiring board has a reduced width, the wire holder (which serves as a swinging section) is not prevented from moving.

According to one embodiment, the objective lens driving apparatus further comprises: a focusing coil, provided for the lens holder, for driving the lens holder in the focusing direction; a pair of tracking coils provided for those portions of the lens holder which are ends, as viewed in the tracking direction; and a flexible printed wiring board, provided for the wire holder and having external-connection wiring connected to the focusing coil and/or the tracking coils, the flexible printed wiring board having a slit formed in a portion which is intermediate as viewed in the focusing direction.

Since the intermediate portion of the flexible printed wiring board has a slit, the wire holder (which serves as a swinging section) is not prevented from moving.

According to one embodiment, the objective lens driving apparatus further comprises: a chassis to which the wire holder is fixed; an electromagnetic driving mechanism, arranged between the chassis and the lens holder, for driving the lens holder; and an actuator cover formed of a material having high magnetic permeability, coupled to the chassis and covering movable portions of the wire and the lens holder.

It is preferable that the chassis and the actuator cover be held at least four positions. For example, the cover and the yoke provided for the chassis are preferably kept in contact with each other in such a manner that the yoke holds the actuator cover.

Since this structure enables the cover to be adsorbed by the chassis, the vibration of the cover is prevented. Since the vibration of the cover is prevented, the fluxes between the magnetic poles are prevented from varying.

According to one embodiment, the objective lens driving apparatus further comprises: a chassis to which the wire holder is fixed; and an electromagnetic driving mechanism, arranged between the chassis and the lens holder, for driving the lens holder, the chassis having a depression formed in a surface opposite a surface for which the wire holder is provided, Where this structure is used for adjusting the tilt angle in the tangential direction of the lens, the wire holder is provided with a stepped portion at a position away from the objective lens. Such a stepped portion enables the adjustment to be made with a high degree of freedom.

The structure described above is also advantageous in that the lens holder is allowed to move in a wide range with no need to employ a thick objective lens driving apparatus.

According to one embodiment, the lens holder and the wire holder are preferably suspended by reduced-width, thin suspension members. The suspension members are preferably designed such that they can be easily cut off or removed. For example, they are half cut. To provide half-cut structures, pressing or etching may be utilized. If the suspension members are made of plates having a thickness of 80 $\mu$m, the half-cut portions may be 30 $\mu$m or so. When pressing is utilized, the half-cut portions are provided by forming V-shaped grooves. When etching is utilized, they are provided by forming a U-shaped groove.

It is preferable that the suspension members extend in the same direction as the wires. Where this structure is employed, the wire holding frame can be removed without subjecting the wires to an external force.

The suspension members are preferably located at positions corresponding to weld lines with reference to the position where the mold resin is injected from the mold. When this structure is adopted, the resin flows toward the suspension members after reaching the weld lines. Since the weld lines are deformed and set in the fitted state, the mechanical strength of the weld-line portions is improved, and that of the entire holder is also improved.

[III] According to the third aspect of the present invention, there is provided an objective lens driving apparatus incorporated in an optical disk apparatus which is for recording or reproducing information from an optical disk, the objective lens driving apparatus comprising: a lens holder which holds an objective lens and is driven in a focusing direction and a tracking direction with reference to the optical disk; at least two wires having first ends secured to the lens holder and controlling posture of the lens holder; and a wire holder to which second ends of the wires are fixed, the wire holder having swinging sections which are integral therewith and to which the second ends of the wires are fixed.

According to this structure, the swinging sections, which hold the second ends of the wires, are integral with the wire holder. Accordingly, the wires can be assembled with such high accuracy as corresponds to the accuracy at which they are molded. This structure is effective in suppressing the resonance of the wires, so that excellent servo characteristics are ensured at high-frequency regions.

[IV] According to the fourth aspect of the present invention, there is provided an objective lens driving apparatus incorporated in an optical disk apparatus which is for recording or reproducing information from an optical disk, the objective lens driving apparatus comprising: a lens holder which holds an objective lens and is driven in a focusing direction and a tracking direction with reference to the optical disk; at least two wires having first ends secured to the lens holder and controlling posture of the lens holder; and a wire holder to which second ends of the wires are fixed, the lens holder having first bosses to which the first ends of the wires are to be fixed, the first ends of the wires having first insertion holes into which the first bosses are loosely inserted, the first bosses and the first insertion holes being fixed together by means of an adhesive, the wire holder having second bosses to which the second ends of the wires are fixed, the second ends of the wires having second insertion holes into which the second bosses are loosely inserted, and the second insertion holes and the second bosses being fixed together by means of an adhesive.

With this structure, the wires can be reliably bonded to the lens holder or the wire holder, with no need for direct adhesion between them.

[V] According to the fifth aspect of the present invention, there is provided an optical head apparatus comprising the objective lens driving apparatus according to one of the second to fourth aspects. There is also provided an optical disk apparatus comprising the optical head apparatus.

The structure of the fifth aspect is effective in suppressing the tilt phenomenon, and the optical disk apparatus comprising this optical head apparatus suppresses read and write errors to the maximal degree.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
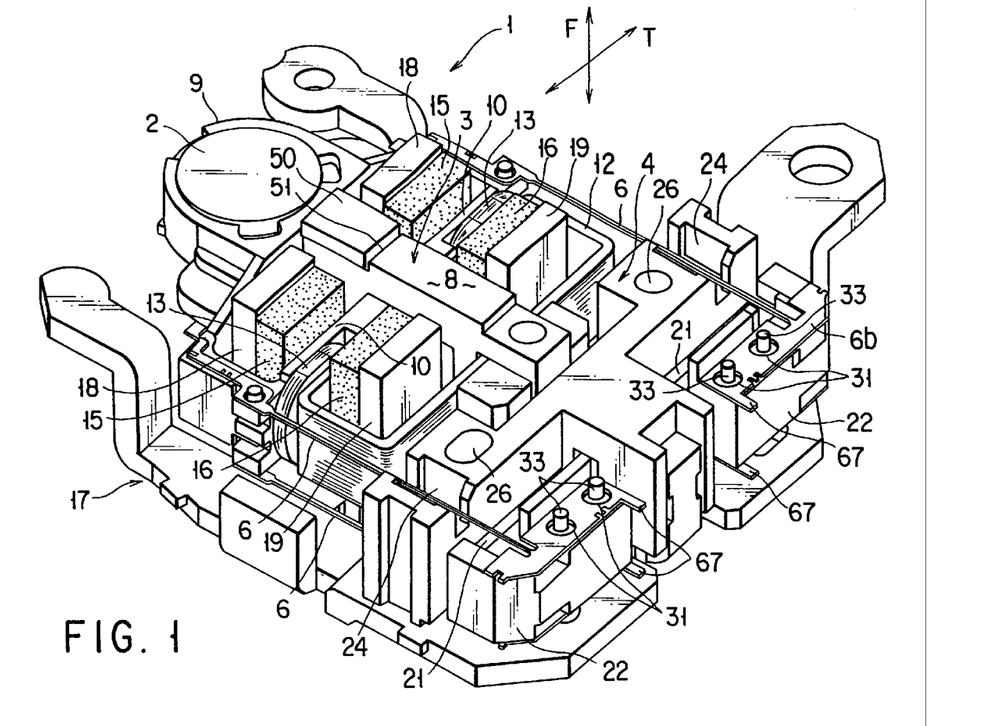
FIG. 1 is a perspective view of an objective lens driving apparatus according to one embodiment of the present invention.

FIG. 1 is a perspective view showing an objective lens driving apparatus 1 according to the present invention.
(Basic Structure)

Figure 4:
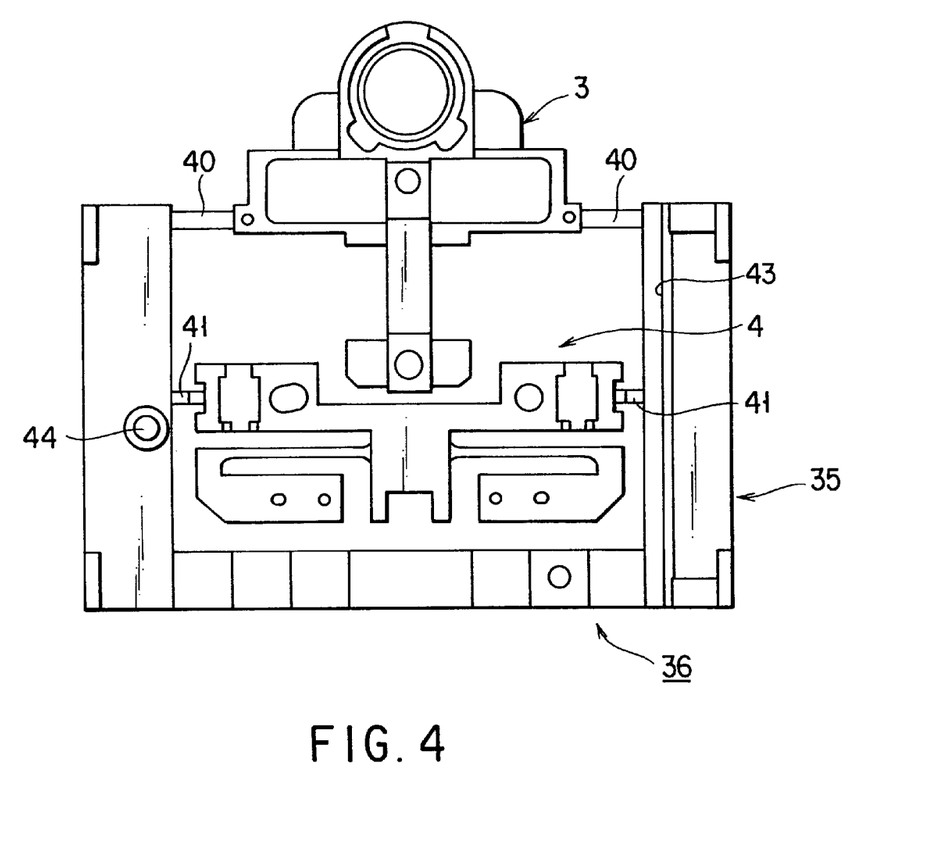
FIG. 4 is a plan view showing how the objective lens driving apparatus is manufactured.

The objective lens driving apparatus is a so-called four-wire system. A lens holder 3 for supporting an objective lens 2 and a wire holder shown in FIG. 4 are connected together by means of four elastic wires 6 in such a manner that the lens holder 3 (i.e., the objective lens 2) can be moved in both the focusing direction (F) and the tracking direction (T).

The lens holder 3 is provided with a center rib 8. The center rib 8 has a lens holder section 9 located at the distal end and adapted to hold the objective lens 2. Stays 10 extend in the tracking direction From the intermediate portion of the center rib 8.

A focus-direction driving coil 12 (hereinafter referred to as a focus coil) and a pair of tracking-direction driving coils 13 (hereinafter referred to as tracking coils) are fixed to the rear end of the center rib 8.

The focusing coil 12 is shaped as a rectangular tube, the cavity of which extends in the focusing direction (i.e., the vertical direction). The central portion of the focusing coil 12, as viewed in the tracking direction, is fixed to the reverse side of the center rib 8. The paired tracking coils 13 are in the regions between the stays 10 and the ends portions of the focusing coil 12, as viewed in the tracking direction. The regions in which the tracking coils 13 are located are filled with an adhesive (such as an epoxy resin). With this structure, the tracking coils 13 are firmly secured to the lens holder 3 not only through the focusing coil 12 but also directly.

Magnets, indicated by numerals 15 and 16 are arranged to face each other, with the focusing coil 12 and the tracking coils 13 being located therebetween. The magnets 15 and 16 are fixed to the surfaces of a pair of yokes 18 and 19 (FIG. 9), and these yokes stand upright on the chassis 17 to which the wire holder 4 is fixed. The: magnets 18 and 19 are arranged to form magnetic paths.:

With this structure, either the focusing coil 12 or the tracking coils 13 located between the magnets 15 and 16 is energized. As a result, the lens holder 3 is moved by a driving force acting in either the focusing direction or tracking direction. Since two pairs of magnets are employed, an intense magnetic field is generated. Even though the apparatus is small as a whole, a desirable servo driving effect is obtained.

The posture of the lens holder 3 is controlled by the four wires 6 connected thereto, and the objective lens is prevented from tilting.

Figure 2:
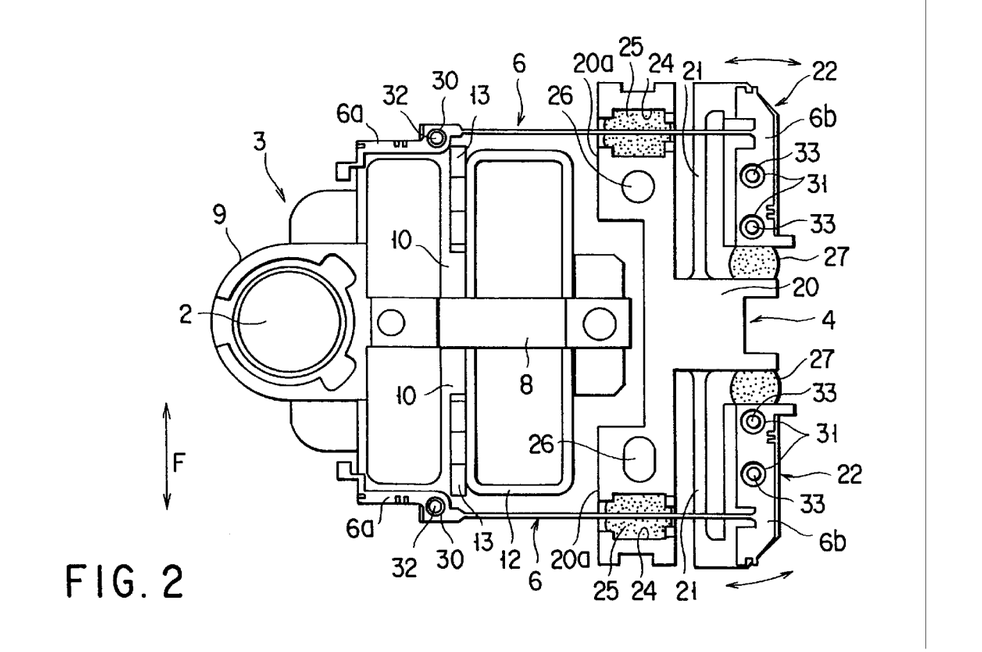
FIG. 2 is a plan view showing the positional relationships between a lens holder, a wire holder, and wires.

FIG. 2 is a plan view showing the positional relationships between the lens holder 3, the wire holder 4, and the wires 6. The structure of the wire holder 4 will be described, referring to that Figure. The wire holder 4 comprises a main body 20 having arms 20a extending in the tracking direction (F). The wire holder 4 also comprises a pair of swinging sections 22 which are swingably coupled to both sides of the main body 20 by means of flexible thin members 21.

A gel reservoir 24 is provided in the distal end portion of each arm 20a. It is located at a position corresponding to an intermediate portion of the corresponding wire 6. Gel 25 is sealed in the gel reservoir 24, and the intermediate portion of the wire 6 is held by the gel 25, thus preventing vibration of the wire. Each arm 20a is provided with a reference hole 26 used for positioning the objective lens 2.

The swinging sections 22 hold the ends of the wires 6. The swinging sections 22 are designed to have such a natural frequency (several hundred kHz) as enables the absorption of displacement, which may occur in the bucking direction of the wires 6 when the objective lens apparatus is used within a predetermined servo band. One end of each swinging section 22 is coupled to the corresponding thin member 21, while the other end is located close to the main body 20. Gel 27 serving as a damper for the swinging section 22 is inserted between each swinging section 22 and the main body 20. The Gel 27 may be replaced with any kind of material as long as this material has a vibration-preventing effect. For example, a viscous material or an elastic material may be used.

The wire holder 4 and the lens holder 3 are formed of a hard synthetic resin, such as a liquid crystal polymer.

The wires 6 are formed of a material having moderate elasticity and conductivity. For example, they are formed of BeCu or another copper-based material with the required property. Flat fixing pads 6a and 6b are located at the ends of each wire 6. The fixing pads 6a and 6b are adhered to the wire holder 4 and the lens holder 3.

In FIGS. 1 and 2, numerals 30 and 31 indicate adhesion holes formed in the fixing pads 6a and 6b. Bosses 32 and 33 projected from the lens holder 3 and the wire holder 4 are loosely inserted in the adhesion holes 30 and 31, and the gaps between the bosses 32, 33 and the holders 3 and 4 are filled with an adhesive, thereby obtaining reliable bonding strength.

The wires 6 are arranged in such a manner that one pair of them extend in the tracking direction and another pair of them extend in the focusing direction.

With this structure, the posture of the lens holder 3 is controlled by the four wires 6, as described above, and the lens holder 3 can be driven in both the focus and tracking directions. Hence, the position of the optical spot formed by the objective lens 2 can be moved along a track of the optical disk.

Problems of DVD-Systems and CD-systems of High Transfer Rates

The objective lens driving apparatus of the embodiment is designed for use in optical disk drives, particularly a DVD system and a CD-ROM system with a high transfer rate. When this type of objective lens driving apparatus is designed, the control of a tilt angle and the performance in a high-frequency servo band have to be taken into due consideration.

Figure 3:
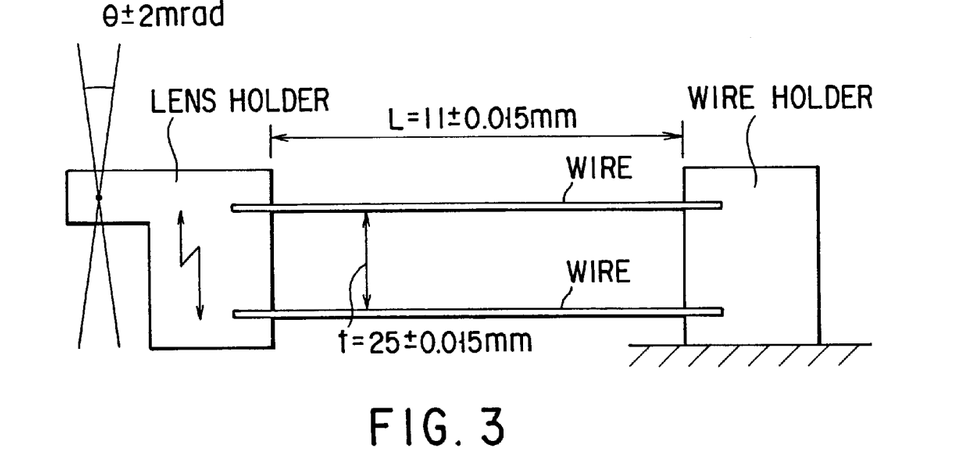
FIG. 3 is a schematic diagram illustrating an allowable precision error when the lens holder, the wire holder ad the wires are assembled together.

FIG. 3 is a schematic diagram showing the positional relationships between the lens holder, the wire holder and the wires. In a DVD-system, the allowable tilt angle error should be, for example, 2 mrad in the focusing-direction movable range, as described above. Let us assume that the distance "L" between the support points of one wire is 11 mm and the distance "t" between two wires is 2.5 mm, as shown in FIG. 3. In this case, the allowable relative errors for "L" and "t" should be 0.015 mm so as to attain the allowable tilt angle 2 mrad.

Although the wires, the wire holder and the lens holder has to be positioned accurately relative to each other, ordinary jigs cannot be employed for this positioning. This is because the jigs are required to have precision which is about one tenth of the allowable relative error. Such a requirement cannot be easily satisfied in practice with an ordinary mechanical assembly technique since the jigs are mass-produced.

The lens holder and the wire holder are molded components. If they are formed by use of different molds, it is necessary to consider the dimensional errors between the molds. If a large number of components are manufactured by use of the same mold, model numbers must be assigned to them for management.

In the case of a small-sized objective lens driving apparatus, the wires employed in them are very thin and easily deformed. At the time of positioning or assembly, it may happen that the wires will be deformed, resulting in an dimensional error.

In the case where the objective lens driving apparatus of the present invention is incorporated in a DVD system, the servo band will be a band of very high frequencies in comparison with the case where the same apparatus is incorporated in a CD system. For example, the servo band will be 1.3 to 2.3 kHz in the focusing direction, and will be 3 to 3.8 kHz in the tracking direction. It is therefore important to prevent resonance of the wires. In particular, buckling vibration must be prevented since such vibration will cause the secondary resonance in the neighborhood of the upper limit of the servo band to exceed the allowable limit value. In addition, the tilt angle must not greatly exceed the allowable limit in spite of the lateral-direction inertia force produced when the optical head apparatus is performing a seek operation at high speed.

In one type of conventional apparatuses, the wires are held at one end by a flexible board attached to a wire holder. This structure, however, inevitably requires a large number of parts. In addition, the assembling accuracy between the flexible board and the wire holder is greatly dependent on the positions where the wires are attached.

According to the present invention, the problems at the time of assembly are solved by adopting the manufacturing method described below.

According to the present invention, the swinging sections 22 are integrally provided for the wire holder 4, and the wires 6 are attached to the swinging sections 22. To suppress the buckling vibration of the wires 6, the gel reservoir 24 of the wire holder main body 20 is filled with gel 25, and the intermediate portion of each wire 6 is held by the gel 25 of the gel reservoir 24. In this manner, the problem regarding the high-frequency band is solved. According to the embodiment, another gel reservoir 8a is formed at the position indicated by "8a" in FIG. 5, and this gel reservoir 8a is also filled with gel 28. With this structure, the lens holder is prevented from vibrating at a frequency within the high-frequency band. According to the present embodiment, moreover, the space between the swinging section 2 and the wire holder 30 is filed with gel 27, so as to suppress the vibration of the swinging section.

Manufacturing Method of Objective Lens Driving Apparatus

FIGS. 4–11 are plan and perspective views showing how the objective lens driving apparatus according to the present invention is manufactured.

As shown in FIG. 4, the lens holder 3 and the wire holder 4 are prepared as one integrally molded member 36 in the state where the two holders are suspended by a U-shaped holder connecting frame 35. FIG. 4 is a view of the upper side of the member 36.

Figure 5:
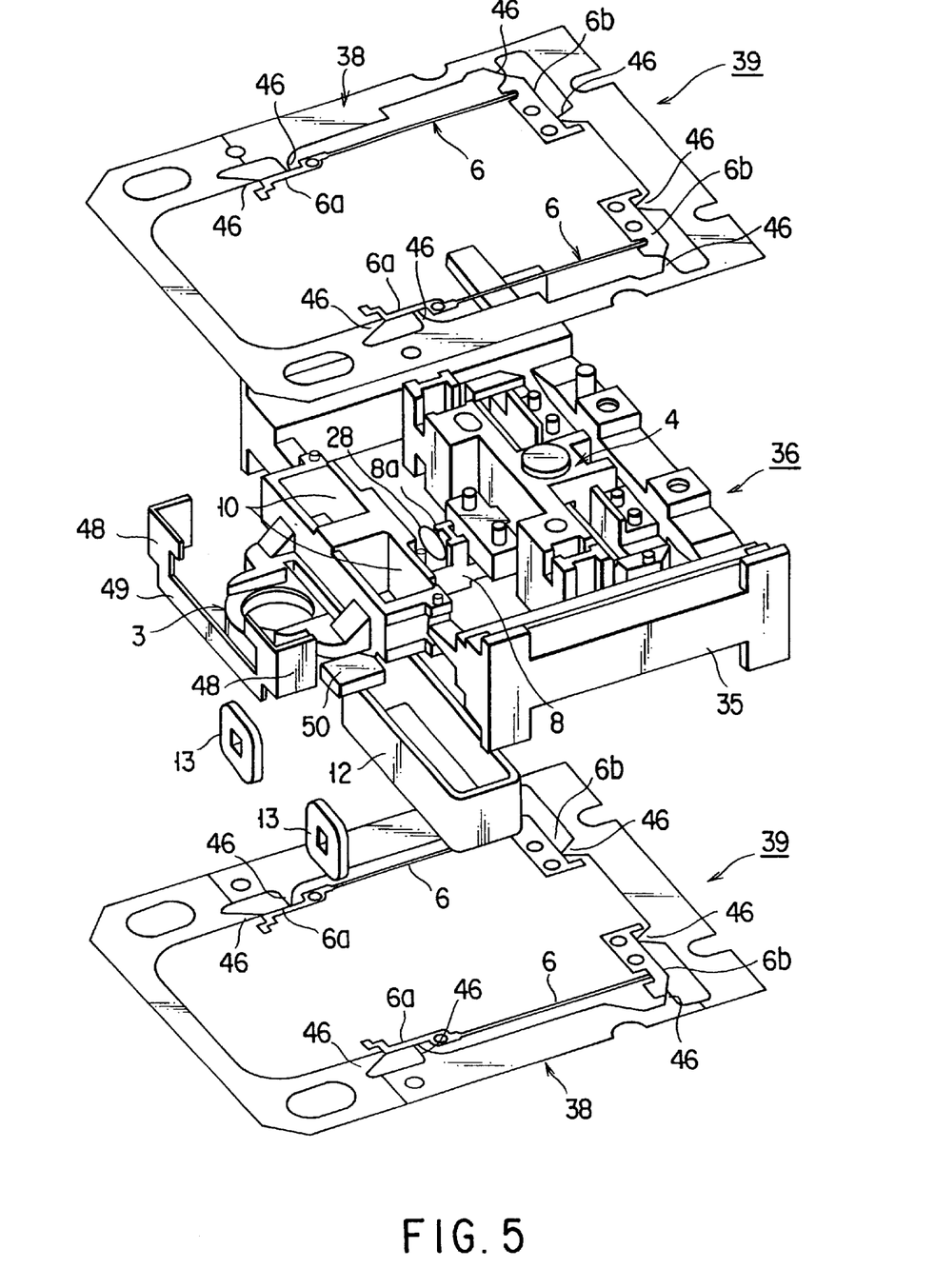
FIG. 5 is a perspective view showing how the objective lens driving apparatus is manufactured.

As shown in FIG. 5, the wires 6 are prepared as integrally molded sheet-like metal member 39s in the state where they are suspended by a rectangular wire holding frame 38.

A detailed description will now be given of the integrally molded member 36 including the lens holder 3 and the wire holder 4, and of the integrally molded members 39 including the wires 6.

The integrally molded member 36 including the lens holder 3 and the wire holder 4 is shown in FIG. 4. As shown in FIG. 4, the holder connecting frame 35 and the lens holder 3 are suspended by two narrow and thin suspension members 40. Likewise, the frame 35 and the wire holder 4 are suspended by two narrow and thin suspension members 41. As will be described later, the wires 6 are first assembled and secured to the lens holder 3 and the wire holder 4, and then the suspension members 40 and 41 are bent and cut off for the removal of the holder connecting frame 35.

To enable the suspension members to be easily bent or cut off, it is preferable that the suspension members 40 and 41 have half-cut portions. These half-cut portions are provided by pressing or etching. Where the suspension members are made of plates having a thickness of 80 $\mu$m, the half-cut portions may be 30 $\mu$m or so. When pressing is utilized, the half-cut portions are provided by forming V-shaped grooves. When etching is utilized, they are provided by forming a U-shaped groove.

To prevent the wires 6 from being applied with a force, the half-cut portions of the suspension members 40 and 41 extend in the same direction as the wires 6. With this structure, the wires 6 are prevented from being undesirably bent in the step of bending and cutting off the suspension members 40 and 41.

The suspension members 40 and 41 are preferably located at positions corresponding to weld lines with reference to the position where mold resin is injected from the mold. The term "weld lines" used herein is intended to mean lines along which resins injected into the mold collide with each other inside the mold. Where the suspension members 40 and 41 are provided at the positions corresponding to the weld lines, the resin that has reached the weld lines flows toward runner sections used for forming the suspension members. In this case, the weld lines are distorted and have complicated shapes. In a microscopic aspect, the weld-line portions have a large number of fitted-state shapes, the mechanical strength of the weld-line portions is improved, and the rigidity of the entire holder is also improved. Accordingly, the occurrence of a complicated resonant mode is suppressed.

The holder connecting frame 35 holds the lens holder 3 and the wire holder 4 in such a manner that those faces of the holders 3 and 4 to which the fixing pads 6a and 6b of the wires 6 are at the same level. The holder connecting frame 35 has two side portions between which the holders 3 and 4 are sandwiched. One of the side portions is provided with a stepped section 43 engageable with the edge of the wire holding frame 38, and the other side portion is provided with a projection 44 for positioning. The projection 44 is tapered; its diameter gradually decreases toward the tip end. This structure enables smooth and easy engagement with reference to the wire holding frame 38.

As shown in FIG. 5, each integrally molded member 39 holds its two wires 6 by means of four suspension members 46. Since the structure shown in FIG. 5 employs two integrally molded members 39 of wires, the total number of suspension members 46 is eight. The coupling portions between the suspension members 46 and the wires 6 have the narrowest width, so that the suspension members 46 and the wires 6 can be easily separated from each other by cutting off the coupling portions.

Figure 6:
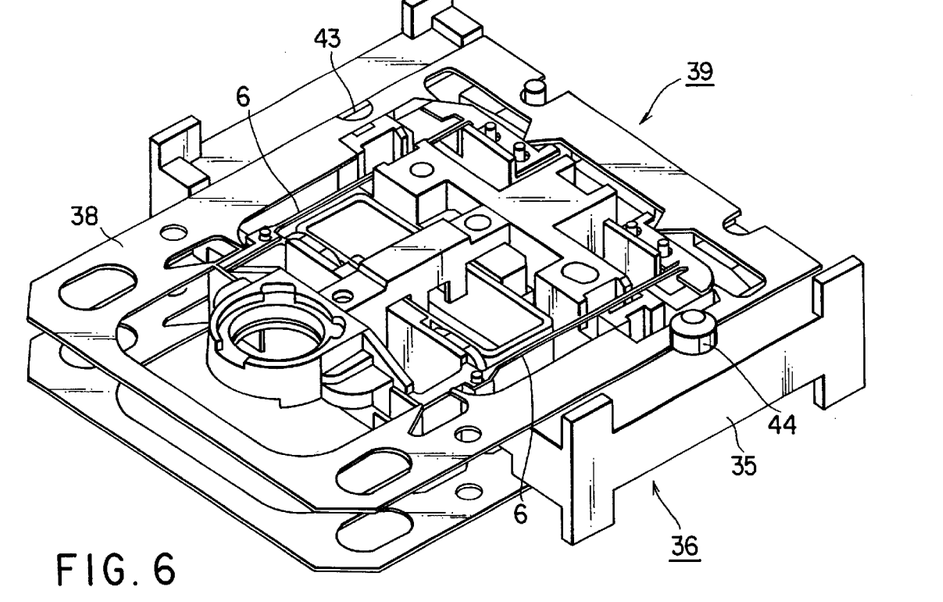
FIG. 6 is a perspective view showing how the objective lens driving apparatus is manufactured.
Figure 7:
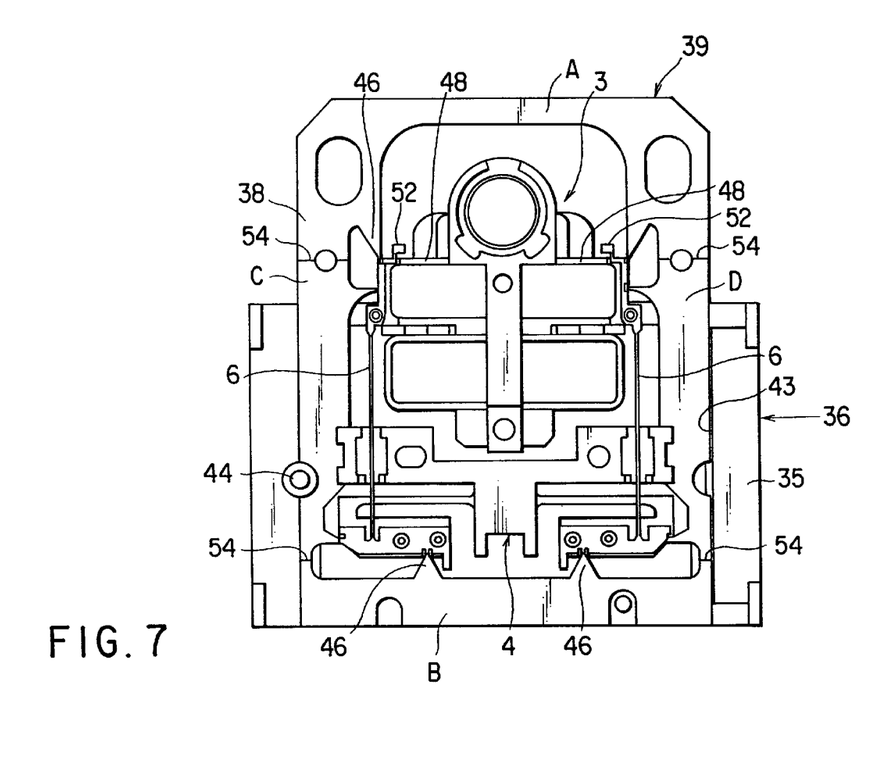
FIG. 7 is a plan view showing how the objective lens driving apparatus is manufactured.

As shown in FIG. 6, the rectangular wire holding frame 38 for holding the wires 6 is so designed as to enable the wires 6 to be positioned when the wire holding frame 38 is brought into contact with the stepped section 43 and projection 44 (FIG. 4) of the holder connecting frame 35. The state of positioning is shown in FIG. 7 in two dimensions.

The manufacturing steps will be described in the order in which they are carried out.

(1) The integrally molded member 36 including the lens holder 3 and the wire holder 4 which are connected together by the holder connecting frame 35, is prepared, as shown in FIG. 5. Then, the tracking coils 13 and the focusing coil 12 are fixed to the lens holder 3 of the integrally molded member 36 by use of an adhesive (e.g., a UV-setting resin, an epoxy resin, or the like).

The tracking coils 13 are secured by the adhesive introduced into the space between the focusing coil 12 and the stays 10 of the lens holder 3. Accordingly, the focusing coil 12 is secured to the lens holder 3 not only through the tracking coils 13 but also directly. With this structure, a driving force can be efficiently transmitted from the coils 12 and 13 to the lens holder 3, with the result that the high-frequency characteristics of the movable portions are improved.

Of the four side portions of the focusing coil 12, the side portion that is closest to the objective lens 2 is coupled directly to the center rib 8 of the lens holder 3 by use of an adhesive. The side portion that is closest to the wire holder 4 and the corresponding portion of the center rib 8 are coated with silicone-based gel (in place of which, a soft adhesive that does not become hard may be used), so that the gel-coated portion can function as a damper. In this manner, there are two fixing portions that are away from each other in the direction in which the wires extend, and different fixing materials are used between them. With this structure, natural vibration of the lens holder 3 (center rib 8) is suppressed, and the secondary resonance of the objective lens 2 is prevented.

Thereafter, a pair of flexible wiring boards 48, used for electrical connection between the coils 12, 13 and the wires 6, are adhered to the front face of the lens holder 3. The flexible wiring boards sandwich the objective lens and are located at those portions of the lens holder which are ends as viewed in the tracing direction. The flexible wiring boards 48 are prepared as an integrally molded member in the state where they are connected by a board holding member 49. This board holding member 49 is removed after the integrally molded member including the flexible wiring boards is assembly with reference to the lens holder 3. Due to this process, the flexible wiring boards 48, which are fine members, are very easy to handle. In addition, since the board holding member 49 is removed after the adhesion step, the movable portions can be light in weight, thus enabling high-speed driving. Terminals (not shown) of the coils 12 and 13 are soldered to the flexible wiring boards 48.

A protective sheet, which is indicated by "50" in the drawings, is adhered to the center rib 8 of the lens-holder 3. As shown in FIG. 1, the protective sheet 50 is located close to the lens holder section 9. In the case of a thin lens driving apparatus, such as that of the present embodiment, the range in which the objective lens 2 is allowed to move in the focusing direction is narrow. If the servo circuit fails to perform control due to an external shock applied thereto, it may happen that the disk will collide with the objective lens 2. To prevent damage to the disk, the protective sheet 50 is employed. The protective sheet 50 is projected more than the objective lens 2 and is thus closer to the disk. The protective sheet 50 is fitted in a recess 51 formed in the center rib 8 of the lens holder 3, and is adhered to the wall of the recess 51 so that it does not separate from the center rib in spite of the friction caused by the disk rotating at high speed.

(2) Next, two integrally molded members 39 including the wires 6 are prepared. As shown in FIG. 5, they are positioned with reference to the integrally molded member 36 that includes the lens holder 3 and the wire holder 4, with one of them being orientated from above and the other being orientated from below.

FIGS. 6 and 7 show how the integrally molded members 39 including the wires 6 are positioned with reference to the integrally molded member 36 including the lens holder 3 and the wire holder 4. As described above, the wires 6 are positioned with reference to the lens holder 3 and the wire holder 4 by bringing the holder connecting frame 35 and the wire holding frame 38 into engagement with each other. To be more specific, the edge of the wire holding frame 38 is fitted in the stepped section 43 of the holder connecting frame 35 and by bringing the projection 44 of the holder connecting frame into engagement with the wire holding frame 38.

By following these procedures, the holders 3 and 4 and the wires 6 can be positioned with reference to one another, with no need to touch them. In addition, since a structure for positioning the holders 3 and 4 and the wires 6 is not needed, the apparatus can be small in size.

To adhere the wires 6 to the holders 3 and 4, the bosses 32 and 33 projected from the holders 3 and 4 are first inserted loosely in the adhesion holes 30 and 31 of the pads 6a and 6b of the wires 6. Then, the gaps between the bosses 32, 33 and the holders 3 and 4 are filled with an adhesive. In this manner, the wires 6 and the holders 3 and 4 are adhered to each other by means of the bosses 32 and 33, and no adhesive is used between the fixing pads 6a and 6b and the upper surfaces of the holders 3 and 4. Owing to this feature, the wires 6 do not move with reference to the holders 3 and 4, and a reliable bonding strength is ensured.

The above-described connection between the holders 3 and 4 and the wires 6 has not been attained until the present invention. According to the present invention, the holders 3 and 4 and the wires 6 are not directly positioned relative to each other, so that it is not necessary to bring them into direct engagement with each other.

(3) Next, projection pieces (indicated with numerals "52" in FIG. 7), which are extended from the pads 6a located on the lens holder side, are soldered to the flexible wiring boards 48. With this structure, the coils 12 and 13 and the wires 6 are electrically connected to each other.

(4) Next, the wire holding frame 38 is removed. The wire holding frame 38 is removed by first taking away portions A and B and then taking away portions C and D (portions A–D are shown in FIG. 7). At the boundaries between portions A–D, half-cut portions 54 (e.g., V-shaped notches) are formed beforehand, so as to enable easy removal of each portion of the wire holding frame 38.

As shown in FIG. 7, the half-cut portions 54 are extended in such a direction that the coupling positions (breaking-off positions) between the suspension members 46 and the wires 6 are on extension lines between the half-cut portions 54. With this structure, both the half-cut portions 54 and the coupling portions of the suspension members 46 can be broken off simultaneously. Hence, the pads 6a and 6b of the wires 6 are prevented from being applied with a force acting in the direction in which the pads 6a and 6b are separated.

Figure 8:
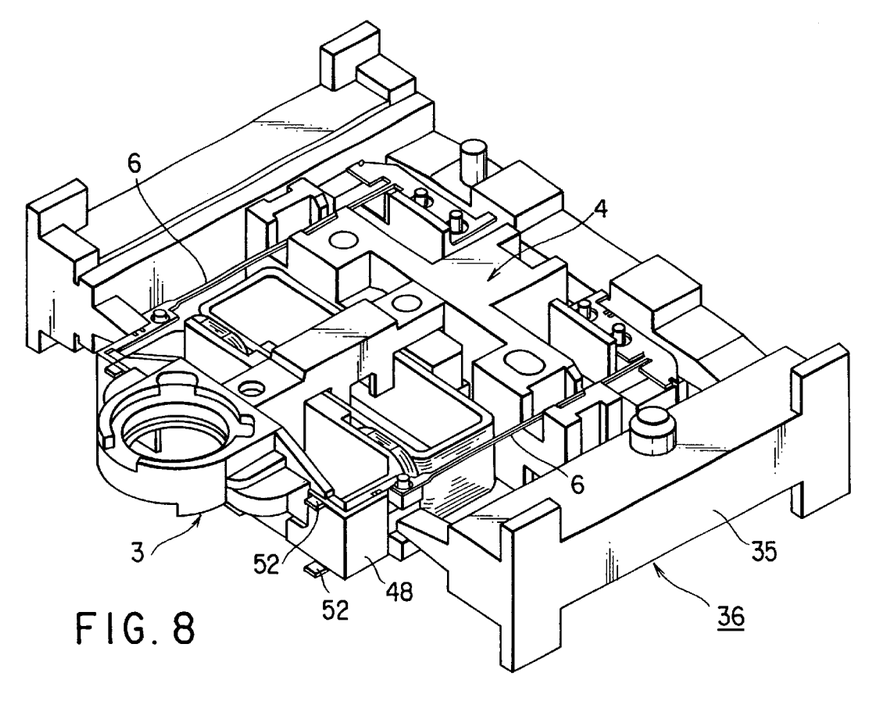
FIG. 8 is a perspective view showing how the objective lens driving apparatus is manufactured.

FIG. 8 is a perspective view showing a state in which the wire holding frame 38 has been removed.

(5) After the process described above, the resultant structure is placed on a jig, and the holder connecting frame 35 is removed. The lens holder 3 and the wire holder 4 are suspended by the holder connecting frame 35 by means of the suspension members 40 and 41. Since these suspension members are thin and narrow in width and formed of a glass fiber-reinforced LCP or the like, they can be removed very easily.

FIG. 2 is a plan view showing a state in which the holder connecting frame 35 has been removed.

The lens holder 3, the wire holder 4 and the wires 6, which are assembled in the manner described above, are hardly deformed, are assembled with high precision, and provide a stable structure.

The tilt angle characteristics are dependent greatly on the initial precision of those portions of the lens and wire holders 3 and 4 to which the wires 6 are fixed and on the assembling accuracy. Although these factors were problems in the mass production of apparatuses, a solution to the problems has been provided by the present invention. According to the present invention, the lens holder 3 and the wire holder 4 are prepared as parts of an integrally molded member. If a large number of lens holders and a large number of wire holders are prepared independently of each other, the differences in the holders of each type and the combinations between the two types of holders have to be taken into account at the time of assembly. For this purpose, the holders of each type must be managed by attaching a model number to each of them. In addition, the molds must be maintained by parting grinding (particle grinding), and articles produced by them inevitably vary in precision before and after the maintenance. Further, articles or members to be assembled cannot be always set on a jig with the same precision. These problems can be solved by the present invention. According to the present invention, the wires 6 are employed in pairs, and the wires of each pair are prepared as parts of an integrally molded member 39 in the state where the wires 6 are suspended by the wire holding frame 38. Owing to this structure, damage to the wires or other members is prevented, and the problems at the time of positioning can be solved.

Figure 9:
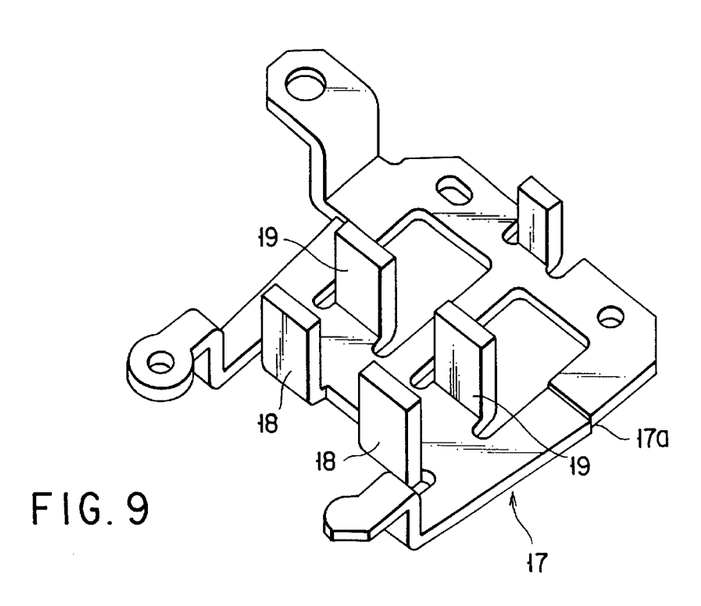
FIG. 9 is a perspective view of a chassis having a yoke.

(6) A description will now be given as to how yokes 18 and 19 and magnets 15 and 16 are assembled.

As shown in FIG. 9, the yokes 18 and 19 are formed by bending parts of the chassis 17. Magnets 15 and 16 are pasted on the surfaces of the yokes 15 and 16, beforehand.

The chassis 17, having the yokes and magnets described above, is placed at the predetermined position on a jig (not shown). This jig has a pair of guide poles for positioning the wire holder 4. The chassis 17 is carefully positioned by inserting the guide poles into the reference holes 26 (FIG. 1) of the wire holder 4. To make the unnecessary play minimal, the guide poles and the reference holes 16 are formed in such a manner that they can be set in a so-called "transitional-fit state."

According to this embodiment, the wire holder 4 and the lens holder 3 are positioned at the accuracy determined by the mold. Therefore, the lens holder 3, the yokes 18 and 19, and the magnets 15 and 16 are positioned at the predetermined accuracy by merely positioning the wire holder 4 with reference to the chassis 17. After being positioned, the wire holder 4 is firmly fixed to the chassis 17 at least two positions by use of UV-setting adhesive.

Figure 10:
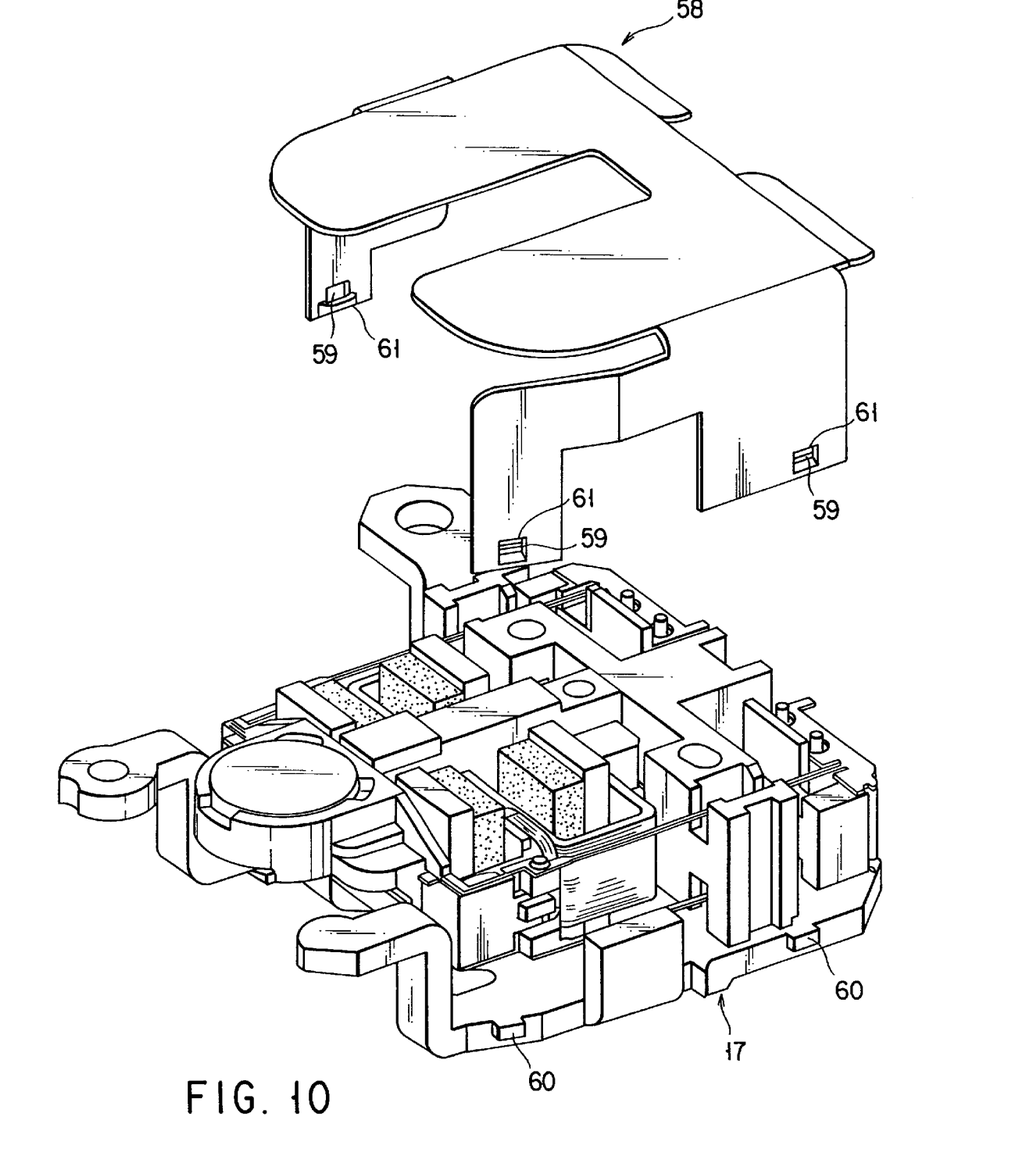
FIG. 10 is a perspective view showing the perspective view showing how the objective lens driving apparatus is manufactured.
Figure 11:
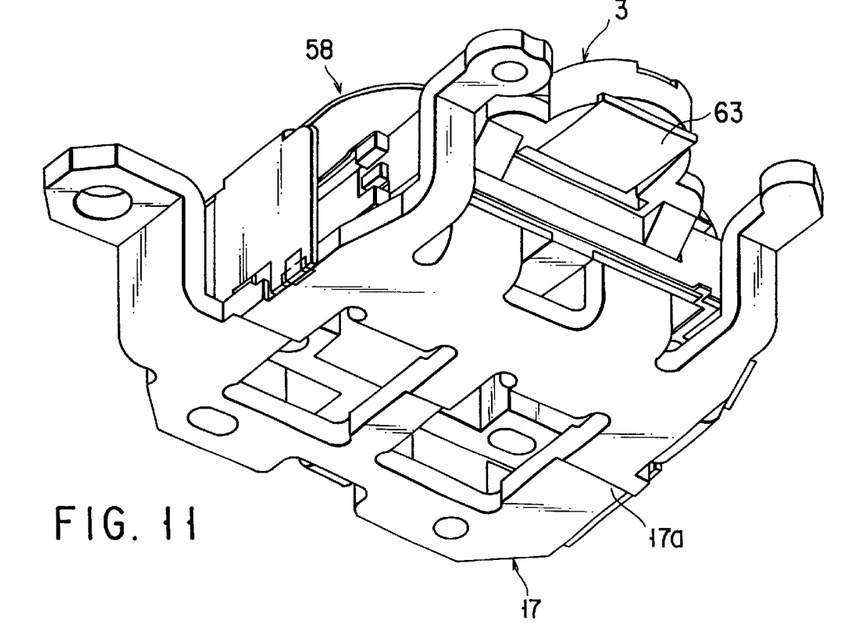
FIG. 11 is a perspective view showing the bottom face of the objective lens driving apparatus.

(7) After the objective lens driving apparatus is assembled with reference to the chassis 17 in the manner described above, an actuator cover 58 is attached to the resultant structure, as shown in FIG. 10. As can be seen from FIG. 10, the actuator cover 58 covers those portions of the objective lens driving apparatus 1 which are opposed to the optical disk. The actuator cover 58 serves to protect the objective lens driving apparatus 1 from the wind pressure or dust caused by the rotation of the optical disk.

The actuator cover 58 is attached to the chassis 17 by engagement between stopper holes 59 formed in the actuator cover 58 and stopper projections 60 formed on the side walls of the chassis 17.

The actuator cover 58 is a light-in-weight magnetic member. It is attracted and firmly coupled to the chassis 17 by the attraction force of the magnets 15 and 16. To be more specific, the actuator cover 58 is in contact with the top faces of the four yokes 18 and 19 and is held on the top faces in the magnetically attracted state. Since the magnets 15 and 16 are not projected from the top faces of the yokes 18 and 19, they do not collide with the actuator cover 58.

With the above structure, the actuator cover 58 can be held at four positions, and vibration due to the resonance of the servo system can be suppressed. In addition, since the actuator cover is made of a magnetic member, it enables formation of a closed magnetic path. Accordingly, a powerful magnetic force can be utilized for driving the lens holder.

In the engaged state between the stopper holes 59 and the stopper projections 60, there is a slight gap in the focusing direction. The actuator cover 58 is provided with disengagement-preventing sections 61, by which the actuator cover 58 is prevented from disengaging from the chassis 17.

(8) Before the actuator cover 58 is attached to the chassis 17, the objective lens 2 and a dichroic filter 56 (which is indicated by "63" in FIG. 11) are provided. The dichroic filter 56 includes a transmission filter that has waveband-selection characteristics for DVD/CD systems. By means of the dichroic filter 56, a laser beam is shaped so that a suitable beam spot is formed on a CD.

Figure 12:
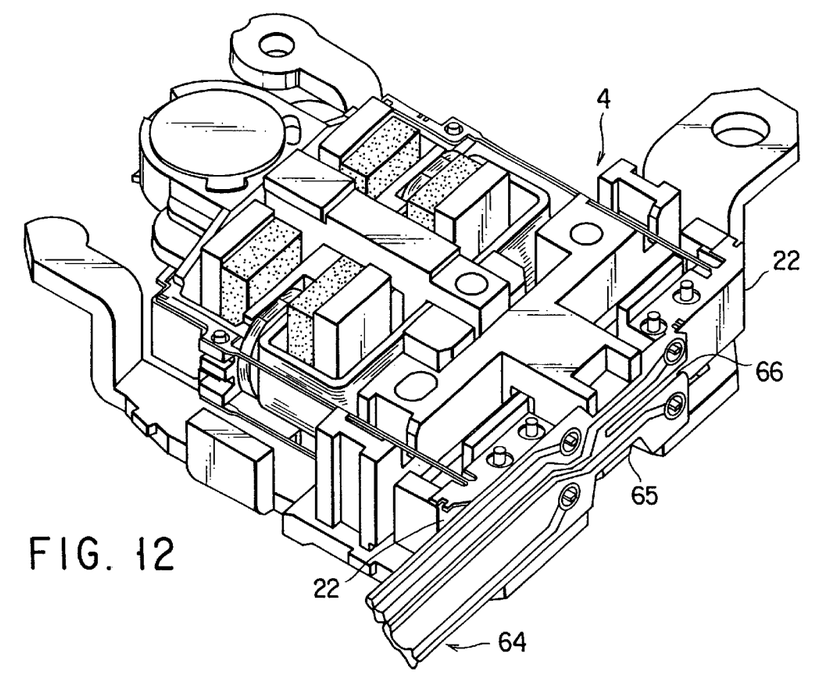
FIG. 12 is a perspective view showing a state where a flexible printed wiring board is attached to the rear end face of an objective lens driving apparatus.

As shown in FIG. 12, a flexible printed wiring board 64 for connection to an external circuit is secured to the rear end faces of the swinging sections 22 of the wire holder 4. The flexible printed wiring board 64 is arranged such that it bridges the region between the swinging sections 22. In order to allow the swinging sections 22 to operate independently of each other, the board's middle portion as viewed in the tracking direction (i.e., the portion located between the two swinging sections 22) has a reduced width. To allow the wire holder 4 to move without restrictions, a slit 66 is formed in the board's middle portion as viewed in the focusing direction. Four projection pieces 67 (FIG. 1) extended from the pads at the rear ends of the wires 6 are soldered to the hands of the flexible printed wiring board 64.

(9) By following the steps described above, the objective lens driving apparatus according to one embodiment of the present invention is completed.

As shown in FIG. 9, a stepped section 17a is formed in the reverse side of the chassis 17, in such a manner that the chassis 17 is lower in level in the portion where the wire holder 4 is arranged than in the portion where the lens holder 3 is arranged.

With this structure, the wire holder 4 located away from the objective lens 2 can be arranged in the depressed portion of the chassis 17. Owing to this, the tilt angle of the objective lens 2 can be adjusted in the tangential direction with a high degree of freedom.

The structure described in the preceding paragraph is advantageous in that the movable range of the lens holder can be as wide as possible, and this advantage can be obtained without an increase in the thickness of the objective lens driving apparatus.

Structure of the Entire Optical Head Apparatus

Figure 13:
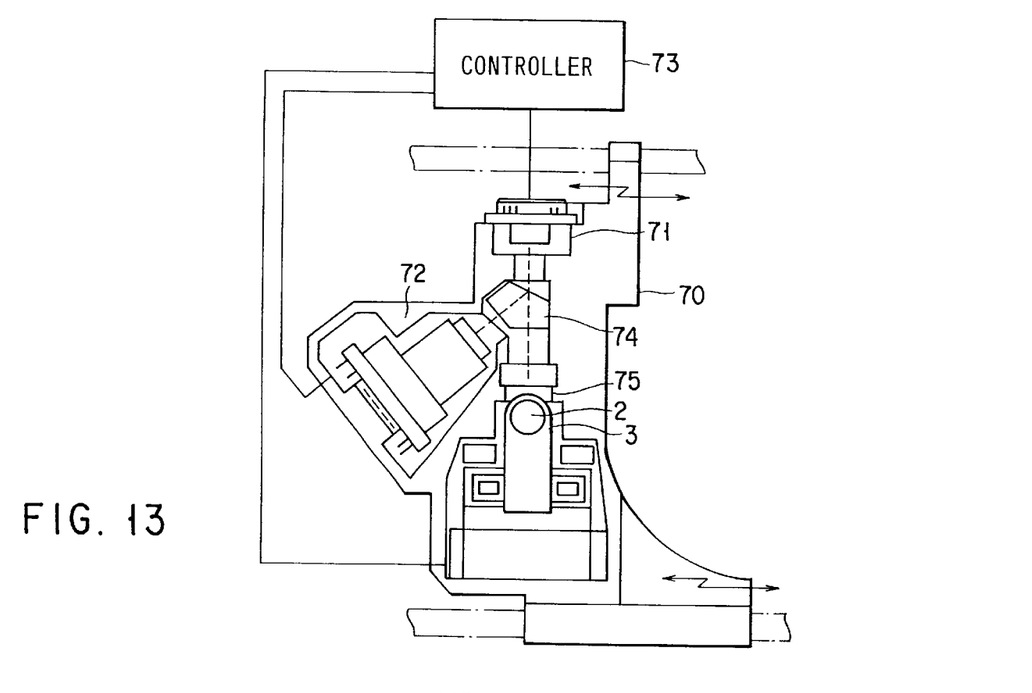
FIG. 13 is a plan view showing an optical head apparatus incorporating an objective lens driving system.

FIG. 13 shows part of an optical head apparatus (which includes an objective lens driving apparatus) and an optical disk apparatus.

Referring to FIG. 13, numeral 70 denotes a base. On this base 70, a first optical module 71 and a second optical module 72 are mounted. The first optical module 71 is a module for a compact disk (CD), while the second optical module 72 is a module for a digital video disk (DVD).

The optical modules 71 and 72 emit a laser beam in accordance with signals supplied thereto from a controller 73. The laser beam travels by way of a first prism 74 (i.e., a waveband-selection reflecting means) and a second prism 75 and enters the objective lens 2 of the objective lens driving apparatus. The laser beam emerging from the objective lens 2 forms a beam spot on an optical disk (not shown).

The laser beam reflected by the optical disk travels back to the optical modules 71 and 72 along the same routes of the emitted beam but in the opposite direction. In accordance with the intensity level of the reflected laser beam, the optical modules 71 and 72 output an electric signal. The base 70 is provided with a feed mechanism 78. By this feed mechanism 7I, the base 70 is advanced or retreated in the radial direction of the optical disk.

According to the present embodiment, the second optical module 72 for DVD is arranged slantwise with reference to the radial direction of the optical disk. To be more specific, the first optical module 71 for CD (wherein the optical path is comparatively short) is arranged at right angles to the feed direction of the feed mechanism 78. The second optical module 72 for DVD, which is considerably large in comparison with the first optical module 71, is arranged in the back region in such a manner that optical axis of the light beam emitted from the second optical module 72 is parallel to the inner wall of the casing of the optical disk apparatus (not shown). With this structure, the apparatus as a whole is compact in size.

Figure 14:
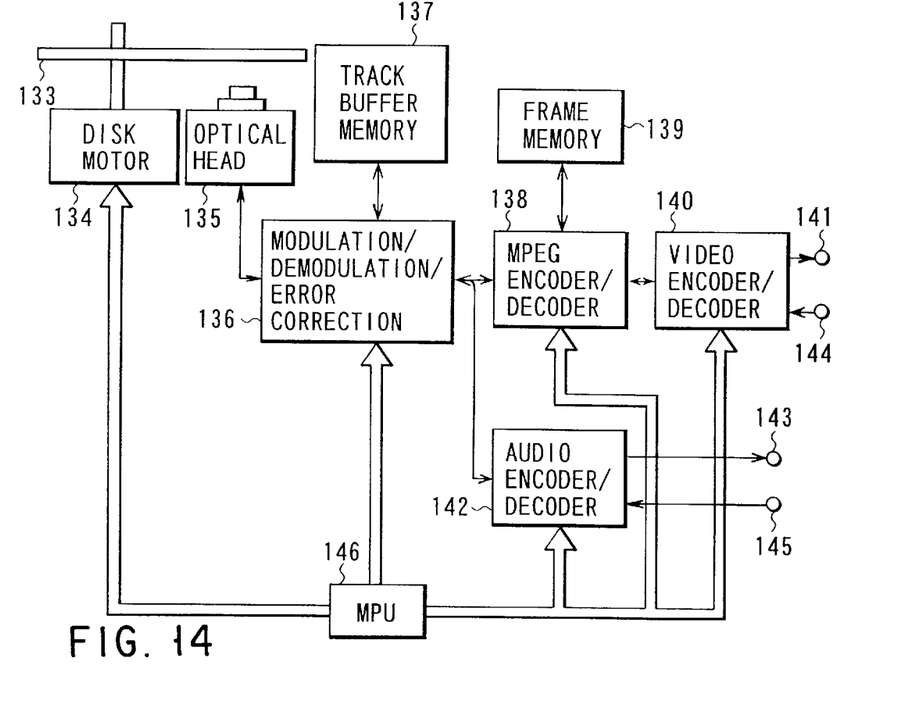
FIG. 14 is a block diagram showing an optical disk apparatus incorporating an optical head apparatus.

FIG. 14 illustrates an optical disk apparatus incorporating an optical head apparatus and used for recording/reproducing video data and sound data with reference an optical disk. Referring to FIG. 14, numeral 133 denotes an optical disk. The optical disk 133 is rotated by a disk motor 134.

An optical head apparatus 135, the structure of which was described above, is opposed to the signal-recorded side of the optical disk 133. From the optical head apparatus 135, a laser beam is radiated to the signal-recorded side of the optical disk 133, so as to write data in the optical disk 133 or read data therefrom. The optical head apparatus 135 is supported in such a manner as to be movable in the radial direction of the optical disk 133.

First, a description will be given of the reproducing operation. Data that are read from the optical disk 133 by the optical head apparatus 135 are supplied to a modulation/demodulation/error correction section 136. This section 136 performs both demodulation processing and error correction processing with respect to the data supplied from optical head apparatus 135, by use of a track buffer memory 137.

Of the data output from the modulation/demodulation/error correction section 136, video data is supplied to an MPEG (Moving Picture Image Coding Experts Group) encoder/decoder 138. This MPEG encoder/decoder 138 performs MPEG decode processing with respect to the video data supplied from the modulation/demodulation/error correction section 136, by use of a frame memory 139.

The video data output from the MPEG encoder/decoder 138 is supplied to a video encoder/decoder 140, for video decode processing. The video data subjected to the video decode processing is produced from output terminal 141. Sound data, included in the data output from the modulation/demodulation/error correction section 136, are supplied to an audio encoder/decoder 142. After being subjected to audio decode processing, the sound data are produced from output terminal 143.

Next, a description will be given of the recording operation. Video data supplied to input terminal 144 are first supplied to the video encoder/decoder 140. After being subjected to video encode processing, the video data are supplied to the MPEG encoder/decoder 138. This MPEG encoder/decoder 138 performs MPEG encode processing with respect to the video data supplied from the video encoder/decoder 140, by use of the frame memory 139.

Sound data supplied to input terminal 145 are first supplied to the audio encoder/decoder 142, for audio encode processing. The video data output from the MPEG encoder/decoder 138 and the sound data output from the audio encoder/decoder 14 are supplied to the modulation/demodulation/error correction section 136.

The modulation/demodulation/error correction section 136 performs modulation processing and error code attaching processing with respect to the supplied image data and the sound data, by use of the track buffer memory 137. The data output from the modulation/demodulation/error correction section 136 are recorded in the optical disk 133 by the optical head 135.

The disk motor 134, the modulation/demodulation/error correction section 136 and the MPEG encoder 142 are controlled by an MPU (Micro Processing Unit) 146.

Although one embodiment of the present invention has been described above, the present invention is in no way limited to that embodiment and can be modified in a variety of manners, without departing from the spirit and scope of the present invention.

For example, in the above embodiment, two swinging sections 22 are provided for the wire holder 4. In place of this structure, a single swinging section 22 may be provided on one side of the wire holder 4. Since, in this case, the wire holder 4 is secured on the side where the swinging section is not provided, improvements on the tilt angle characteristics can be expected.

In the above embodiment, the holders 3 and 4 are prepared as parts of an integrally molded member, and the wires 6 are also prepared in the same way. However, the present invention covers the case where only the wires 6 are prepared as parts of integrally molded members.

In the above embodiment, the swinging sections 22 are held by thin members 21 that are integrally formed with the wire holder 4. The thin members 21 may be replaced with metallic leaf spring members.

In the above embodiment, the actuator cover 58 is held by means of the yokes 18 and 19. This holding structure may be replaced with any type of structure as long as the actuator cover 58 is supported at four positions or more. In addition, the actuator cover 58 need not be a magnetic member. Even if it is made of a nonmagnetic member, the intended function can be attained as long as the surface opposed to the optical disk is held at four positions or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing an objective lens driving apparatus, comprising a lens holder which holds an objective lens, at least two wires having first ends secured to the lens holder and controlling posture of the lens holder, and a wire holder to which second ends of the at least two wires are fixed, the method comprising:

preparing a first integral member including the lens holder and the wire holder, which are connected together by a holder connecting frame that is removed after assembly;

preparing a second integral member including the at least two wires which are suspended from a wire holding frame that is removed after assembly;

positioning the second integral member relative to the first integral member such that the first ends of the at least two wires are connected to the lens holder and the second ends of the at least two wires are connected to the wire holder; and removing the wire holding frame and the holder connecting frame.

2. The method according to claim 1, wherein the at least two wires, the lens holder and the wire holder are positioned relative to one another by bringing the holder connecting frame into contact with the wire holding frame.

3. The method according to claim 1, further comprising fixing the first ends of the at least two wires to the lens holder and the second ends of the at least two wires to the wire holder after the positioning of the second integral member relative to the first integral member and before the removing of the wire holding frame and the holder connecting frame.

\* \* \* \* \*

UNITED STATES PATENT AND TRADEMARK OFFICE
CERTIFICATE OF CORRECTION

PATENT NO.  : 6,404,728 B1
DATED       : June 11, 2002
INVENTOR(S) : Hiroshi Shinozuka et al.

It is certified that error appears in the above-identified patent and that said Letters Patent is hereby corrected as shown below:

<u>Title page,</u>
Item [56], References Cited, U.S. PATENT DOCUMENTS,
Please change "5,374,638 A * 12/1994" to -- 5,734,638 A * 3/1998. --

Signed and Sealed this

Twenty-second Day of April, 2003

JAMES E. ROGAN
*Director of the United States Patent and Trademark Office*